Sept. 29, 1953     M. L. DETWILER     2,653,844
FISH GRIPPER
Filed Oct. 18, 1949
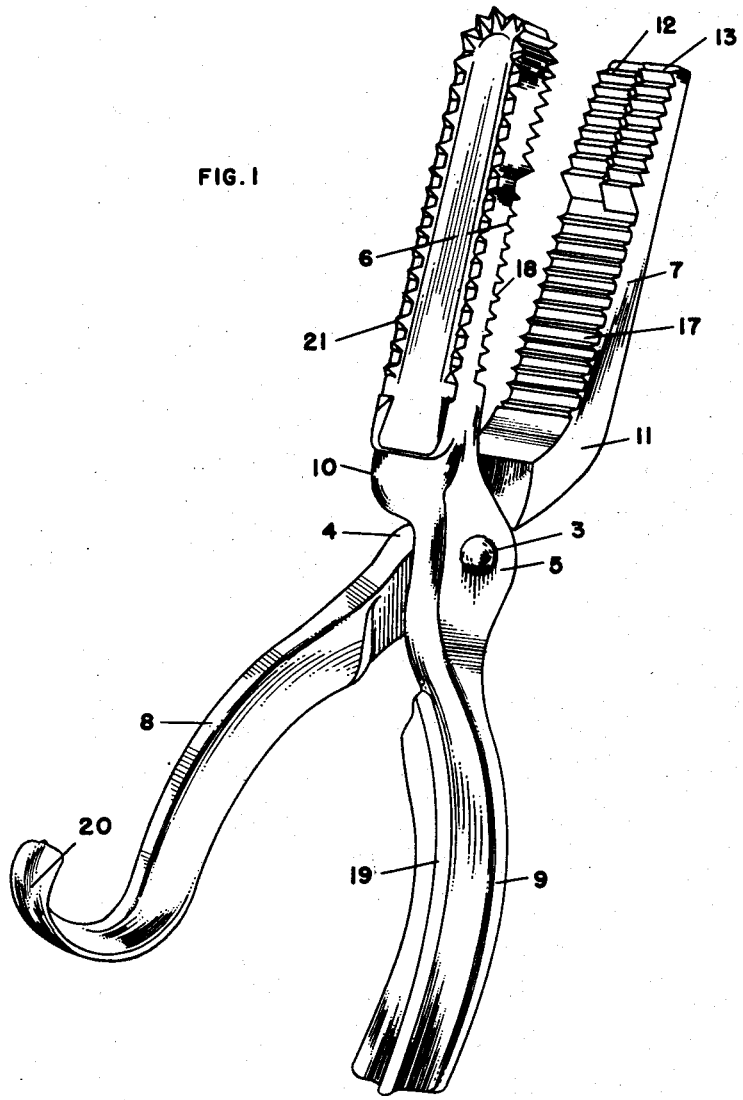
FIG. 1
FIG. 2
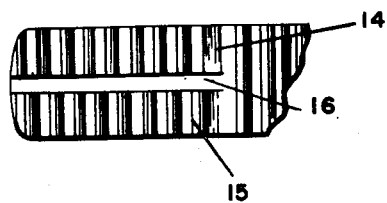
INVENTOR.
MARSHALL L. DETWILER
BY
*ATTORNEY*

Patented Sept. 29, 1953

2,653,844

UNITED STATES PATENT OFFICE 2,653,844

FISH GRIPPER

Marshall L. Detwiler, Lancaster Township, Lancaster County, Pa.

Application October 18, 1949, Serial No. 122,048

1 Claim. (Cl. 294—118)

This invention relates to a fish-gripper, a modern, efficient hand-saving device for fishermen, a tool adapted for holding fish securely while dehooking artificial plugs, lures and hooks from the mouth of a caught fish, as a safeguard against puncture wounds that is very often caused by the sharp teeth and fins of a fish, it grips, scales, fins and cleans, and will be found indispensable for handling all species of fish.

The object of the present invention is to provide a simple tool which will serve a much needed purpose for fishermen.

A further object of the present invention is to provide a tool which can be used for holding poisonous varieties of many species of fish without injury to the fisherman and yet so securely that the fish cannot tear itself loose from the gripper.

A further object of the present invention is to provide a fish gripper with a nose end in which the teeth interlock in a stagger relationship to firmly grip the slippery skins of fish for skinning and to prevent side slippage due to the staggered interlocking teeth.

It is a further object of the invention to provide a substantially broad gripping surface of the elongated jaws and to serrate this gripping surface through the entire extent of the jaw.

It is a still further object of the present invention to provide a tool which is safe against hand injury to fishermen because of the rounded external portions of the gripping instrument, a tool which may be carried in the pocket or holster without the sharp corners doing injury to the articles of clothing in which it is carried.

It is a still further object to provide this tool with additional accessories such as a unique scaling surface.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which:

Figure 1 is a perspective view of the entire instrument showing the lower jaw in detail.

Figure 2 is a detail view of the upper jaw showing the coacting transversely staggered teeth at the outer end of the jaw.

For convenience in describing the gripper will be referred to as having an upper jaw 6, a lower jaw 7, an upper handle 8 and a lower handle 9. This merely refers to the position in which they are shown in Figure 1 as they can, of course, be turned to reverse these conditions. The lever 4 composed of the lower jaw and the upper handle is pivoted to the lever 5 composed of the upper jaw and the lower handle by the pivot pin 3. Adjacent the pivot pin the upper jaw is curved and rounded at the points 10 to provide smooth surfaces which will not pinch the skin nor catch the clothing. The jaw 6 and handle portion 9 are in more or less a straight line which includes the pivot point 3. The part 4 just beyond the pivot point and towards the jaw 7 is bent at an angle at the point 11, also being rounded at this point. The angular bend in the jaw extension in the part 4 enables the rearward portion of each of the jaws 6 and 7 to be brought into substantially parallel relation about one-half inch distance from each other. This enables the user to securely hold a fish throughout a large extent of the fish's body without exerting undue pressure.

The jaws 6 and 7 are divided into two sections, an end or outer section provided with two longitudinal rows of transversely staggered, closely fitting cooperating teeth and a rearward section provided with comparatively shallow teeth extending entirely across the width of the jaws.

Referring particularly to the forward ends of the jaws the teeth are formed in two longitudinal rows 12 and 13 in the lower jaw and 14 and 15 respectively in the upper jaw. The teeth 12 and 13 are transversely staggered and interfit with the teeth 14 and 15. The teeth 12 and 13 in the lower jaw abut each other while those in the upper jaw are separated to provide a recess 16 to receive a slight fold of the skin of a fish to insure a better grip. These teeth when the jaws 6 and 7 are closed are in contact throughout the entire extent of the front end of the jaws. This particular part of the gripper is used in cleaning or skinning fish, removing the dorsal fins or wherever is necessary.

The rearward teeth 17 and 18 of the lower and upper jaws respectively are comparatively shallow, sharp peaked and widely spaced. They provide a means for gripping a substance between the upper and lower jaws securely and yet without undue pressure and are specifically designed for holding a fish while removing plugs, lures, and hooks, without injury to the fisherman.

The handle portions 8 and 9 are curved to more readily fit the hand and provided with strengthening ribs such as 19. The handle portion 8 is curved as shown at 20 to provide a hook which permits a non-slip hand grip or be useful in hanging the tool to the boat or tackle box. The back portion of the jaw 6 is provided with an outside row of sharpened points 21 which is used for the scaling of fish.

What is claimed is:

A fish gripper comprising a pair of pivoted levers each formed with a jaw portion and a handle portion, each of said jaw portions having a forward section and a rearward section, said rearward sections being depressed below said forward sections, end teeth arranged in two longitudinal transversely staggered rows in each of the forward sections of the jaws, said forward sections contacting and interfitting when the gripper is in closed position, shallow transverse parallel teeth in each of said rearward sections, whereby closure of said gripper engages the teeth of one forward section with the teeth of the other forward section, the teeth of the rearward sections being maintained in opposed spaced parallel relation to permit the holding of a small fish between said teeth of the rearward sections without mutilation of said fish.

MARSHALL L. DETWILER.

References Cited in the file of this patent

UNITED STATES PATENTS

| Number | Name | Date |
| --- | --- | --- |
| 97,399 | Holmes | Nov. 30, 1869 |
| 520,212 | McKenzie | May 22, 1894 |
| 655,463 | Smythe | Aug. 7, 1900 |
| 852,479 | Weiss | May 7, 1907 |
| 856,681 | Cederstron | June 11, 1907 |
| 1,170,334 | Riggs | Feb. 1, 1916 |
| 1,546,139 | Leveque | July 14, 1925 |
| 1,647,878 | McWilliams | Nov. 1, 1927 |